PULSE STRETCHER UTILIZING SATURABLE REACTOR WITH SERIES INDUCTOR IN REGENERATIVE FEEDBACK CIRCUIT OF TRANSISTOR

Filed Sept. 11, 1959

INVENTOR
ROBERT K. PHILLIPS
BY George Baron
ATTORNEY 3,073,967

PULSE STRETCHER UTILIZING SATURABLE REACTOR WITH SERIES INDUCTOR IN REGENERATIVE FEEDBACK CIRCUIT OF TRANSISTOR

Robert K. Phillips, Saugerties, N.Y., assignor to International Business Machines Corporation, New York, N.Y., a corporation of New York Filed Sept. 11, 1959, Ser. No. 839,329
2 Claims. (Cl. 307—88.5)

This invention relates to pulse generating equipment in general, and more particularly to pulse generating equipment using magnetic cores.

In many switching and/or logic-solving circuits employing transistors and cores, it is often necessary to apply an inhibit pulse to a magnetic core at the same time that a driving pulse is being applied to such core, so the effect of the driving pulse is nullified. If the inhibit and driving pulses are not in coincidence, the driving pulse might appear before the inhibit pulse and partially switch the magnetic core, the latter being reset upon the appearance of the inhibit pulse. In order to avoid such undesirable operation, the inhibit pulses are generated so that they are decidedly longer than the driving pulses they are to inhibit.

The present invention employs a novel circuit for stretching the inhibit pulse to assure that it exists for a longer period than the driving pulse. Such circuit includes an inductor in series with a blocking oscillator circuit. The inhibit signal to be stretched is initiated by a trigger pulse to start the blocking oscillator. The blocking oscillator, once triggered into conduction, will regeneratively feed back a signal to maintain itself after the trigger pulse has terminated. The inductor has energy delivered to it during the on condition of the blocking oscillator, such energy being delivered back to the oscillator to maintain it on long enough to produce a stretched pulse at the output circuit of such oscillator.

Consequently, it is an object of this invention to provide a new and improved pulse stretching circuit.

It is another object to provide a pulse stretcher that is compatible with switching circuits employing magnetic cores.

It is yet another object to provide a pulse stretcher that is simple in construction and operation yet is reliable and durable.

Other objects of the invention will be pointed out in the following description and claims and illustrated in the accompanying drawings, which disclose, by way of example, the principle of the invention and the best mode, which has been contemplated, of applying that principle.

Figure 1:
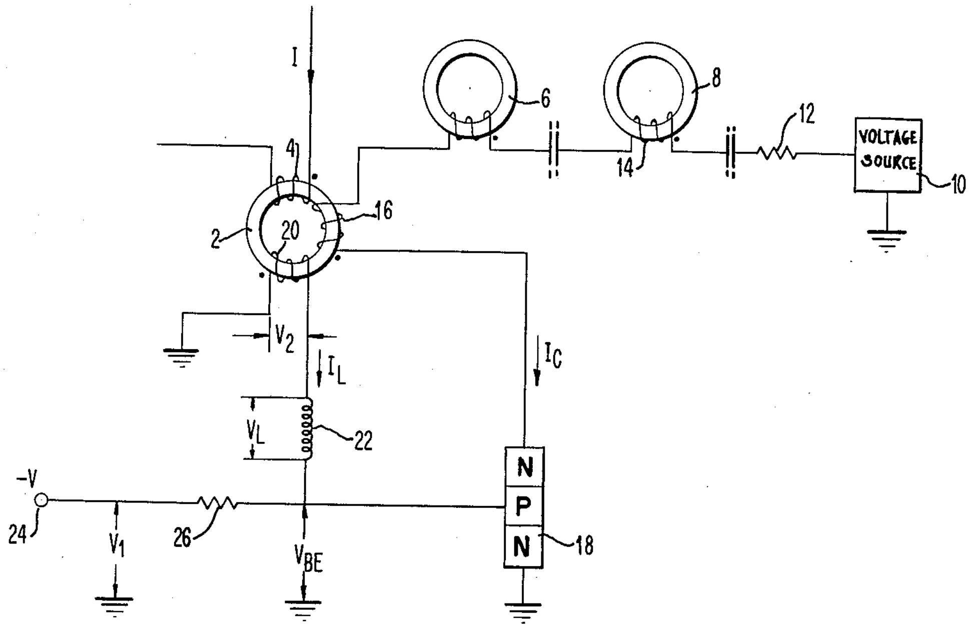

FIG. 1 is an embodiment of the invention employing a transistor as part of the blocking oscillator circuit used to carry out the invention.

FIGS. 2*a*, 2*b*, 2*c* and 2*d* are voltage-time plots for various portions of the circuit of FIG. 1.

Referring to FIG. 1 there is shown a magnetic core 2 preferably, though not necessarily, having a rectangular hysteresis loop of a type well known in the art. A reset winding 4, when carrying current in the direction shown by the arrow, will reset core 2 to its negative remanent state. The driving circuit for applying inhibit pulses to a chain of cores, only two of which 6 and 8 are shown, comprises a voltage source 10, a current limiting resistor 12, a winding 14 on each core, 6, 8, etc., a second winding 16 on core 2, and a transistor 18. Wrapped about core 2 is a third winding 20 that is grounded at one end and its other terminal is connected to an inductor 22, said inductor 22 being connected to the base of transistor 18. Input pulses for triggering transistor 18 into conduction are applied to terminal 24 through a high impedance resistor 26. Such resistor can be replaced with a diode with its cathode connected to that terminal of inductor 22 that is connected to the base of transistor 18.

Figure 2:
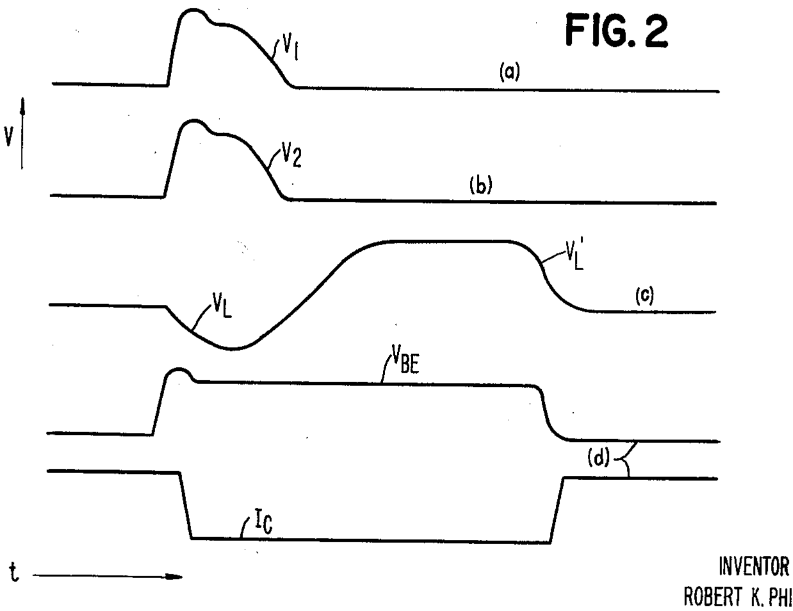

Operation of the circuit will be described by referring to FIGS. 1 and 2 of the drawing and with the assumption that transistor 18 is an N-P-N type that is biased to cut-off by a —V voltage applied at terminal 24. A current pulse I through winding 4 in the direction of the indicated arrow has set core 2 to its negative remanent state. A positive voltage $V_1$ (FIG. 2*a*), sufficient to overcome the negative bias —V and the threshold voltage of transistor 18, is applied at terminal 24 to trigger transistor 18 into conduction. Current $I_c$ flows through winding 16 so as to induce a voltage $V_2$ (FIG. 2*b*) across winding 20, which induced voltage causes current $I_L$ to flow through inductor 22 and apply a positive potential to the base of N-P-N transistor 18. The coupling between winding 16 and winding 20 is regenerative, permitting transistor 18 to stay conducting while core 2 is switching. Most of the current $I_L$ flows to the base of transistor 18 because of the high impedance of resistor 26.

While core 2 is switching, the induced current $I_L$ flowing through inductor 22 creates the potential $V_L$ across such inductor as shown in FIG. 2*c*. The inductor 22 stores energy during the switching of core 2 and, when the latter has completed switching, the stored energy discharges, and the discharge is of the proper polarity $V'_L$ as seen in FIG. 2*c* to deliver current through the base and emitter of transistor 18 and then to ground. This continued flow of current through the transistor 18 produces the stretched pulse shown in FIG. 2*d*. The example selected indicates that the initial $V_1$ pulse appearing at terminal 24 was stretched to a little more than twice its original width. In one operating example, a voltage pulse of 0.25 microsecond was stretched, using the present invention, to about 1.0 microsecond.

The pulse width of $I_c$ shown in FIG. 2*d* can be increased by increasing the number of turns of winding 20 so that more energy can be delivered to inductor 22, such additional energy serving to maintain transistor 18 conducting for a longer period. The circuit, because of the use of a biased transistor base and high impedance element 26, can be made very insensitive to pulses narrower than a preselected width. With the present circuit, one can reject all input pulses appearing at terminal 24 that are narrower than 0.2 microsecond and have amplitudes of less than 2.5 volts. Although the invention has been described to teach the generation of inhibit pulses that are longer in duration than the switching pulses they are to inhibit, it is readily understood that the invention is applicable wherever it is desired to employ a pulse-stretching circuit that is simple and reliable.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An electrical pulse stretching circuit comprising a transistor and a magnetic element, a first winding and a second winding on said magnetic element wherein said windings are regeneratively coupled to each other, a source of electrical energy in series with said second winding and said transistor, means for maintaining said transistor in its cut-off condition so as to prevent current from said source from traversing said second winding, means for applying an electrical pulse to be stretched to said transistor so as to trigger it into conduction whereby said first and second regeneratively coupled windings are actuated so that said first winding applies a feedback current to said transistor to maintain it in its conduction state, and an inductor in series with said first winding and said transistor.

2. An electrical pulse stretching circuit comprising a bistable magnetic element and a transistor having a base, an emitter and a collector, means for setting said magnetic element to its first stable state, a first winding and a second winding on said magnetic element, said second winding being in series with said emitter and said first winding being regeneratively coupled to said second winding and in series with said base, a source of electrical energy in series with said second winding and said transistor, means for maintaining said transistor in its cut-off condition so as to prevent current from said source from traversing said second winding, means for applying an electrical pulse to be stretched to said transistor so as to trigger it into conduction whereby said second winding carries current to switch the bistable magnetic element towards its second stable state, whereby during such switching of the bistable element towards its second stable state a voltage will be induced in said first winding which is fed back to the base of said transistor to maintain it in its conducting state, and an inductor in series between said first winding and said transistor base for maintaining said transistor in its conducting state after said bistable element has completely switched to its second stable state.

References Cited in the file of this patent

UNITED STATES PATENTS

| | | |
|---|---|---|
| 2,447,082 | Miller | Aug. 17, 1948 |
| 2,747,110 | Jones | May 22, 1956 |
| 2,802,101 | West | Aug. 6, 1957 |
| 2,876,440 | Eckert | Mar. 3, 1959 |
| 2,924,725 | Blair | Feb. 9, 1960 |

OTHER REFERENCES

"Digital Computer Components & Circuits," by Richards, published by Van Nostrand, N.Y., 1957.